(12) United States Patent
Cho et al.

(10) Patent No.: US 12,717,635 B2
(45) Date of Patent: Aug. 25, 2026

(54) METHOD, APPARATUS, SYSTEM AND COMPUTER PROGRAM FOR WORKLOAD DEPLOYMENT IN CLOUD SYSTEM INCLUDING FUNCTION ACCELERATOR CARD

(71) Applicant: SAMSUNG SDS CO., LTD., Seoul (KR)

(72) Inventors: Beumjin Cho, Seoul (KR); Namsik Ham, Seoul (KR); Yoonchan Jhi, Seoul (KR); Jihoon Cho, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 422 days.

(21) Appl. No.: 18/370,037

(22) Filed: Sep. 19, 2023

(65) Prior Publication Data

US 2024/0184633 A1 Jun. 6, 2024

(30) Foreign Application Priority Data

Dec. 5, 2022 (KR) ........................ 10-2022-0167947

(51) Int. Cl.
*G06F 9/50* (2006.01)
*G06F 11/34* (2006.01)

(52) U.S. Cl.
CPC ........ *G06F 9/5044* (2013.01); *G06F 11/3495* (2013.01)

(58) Field of Classification Search
CPC ...................................................... G06F 9/5044
(Continued)

(56) References Cited

U.S. PATENT DOCUMENTS 8,713,574 B2 * 4/2014 Creamer ............... G06F 9/5055 718/104
2016/0266916 A1 * 9/2016 Morelli ..................... G06F 9/50
(Continued)

FOREIGN PATENT DOCUMENTS

KR 10-2020-0011548 A 2/2020
WO WO 2018/236408 A1 12/2018

*Primary Examiner* — Charlie Sun
(74) *Attorney, Agent, or Firm* — NSIP Law

(57) ABSTRACT

The present disclosure relates to a method, apparatus, system, and computer program for task deployment in a cloud system including a function accelerator card, and more particularly to a method, apparatus, system, and computer program for task deployment in a cloud system including a function accelerator card, which can efficiently perform task deployment in the cloud system including the function accelerator card to increase the efficiency of the cloud system.

In the present disclosure, disclosed is a task deployment method in a cloud system including one or more host servers and one or more function accelerator cards, which is performed by one or more processors in a task deployment apparatus, the task deployment method including: determining the status of each of available resources for the one or more host servers and the one or more function accelerator cards; calculating each of performance estimation values when the task to be deployed is executed in the one or more host servers or the one or more function accelerator cards under the condition of each of the available resources; and selecting the host servers or function accelerator cards in which the task is to be deployed in consideration of each of the performance estimation values.

19 Claims, 12 Drawing Sheets

(58) Field of Classification Search
USPC .......................................................... 718/104
See application file for complete search history.

(56) References Cited

U.S. PATENT DOCUMENTS

| | | | | |
|---|---|---|---|---|
| 2018/0373664 | A1 | 12/2018 | Vijayrao | |
| 2021/0056066 | A1 | 2/2021 | Vijayrao | |
| 2022/0012104 | A1* | 1/2022 | McClure | G06F 9/5077 |
| 2024/0039808 | A1* | 2/2024 | Singwi | G06F 9/45558 |

* cited by examiner 100
120
130
110
111a
111b
112a
112b

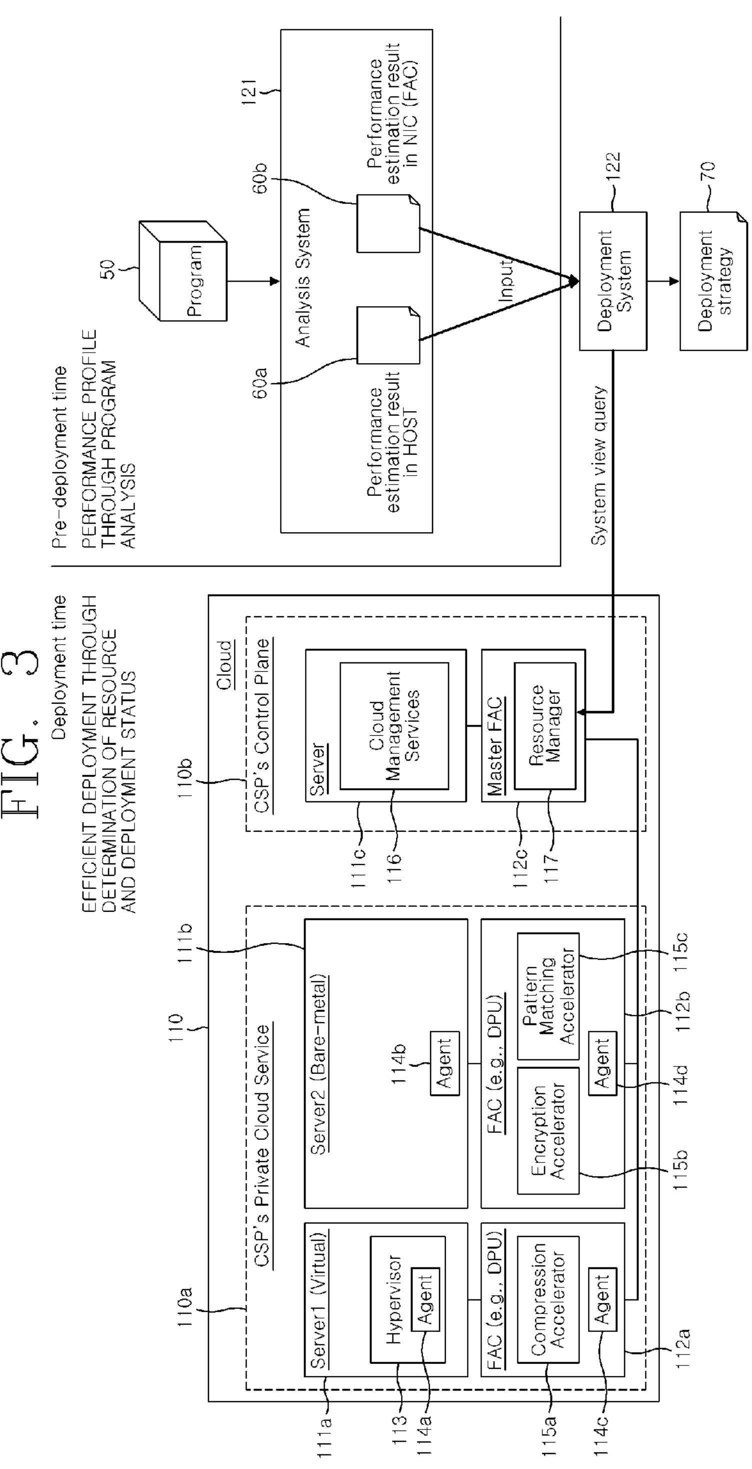
FIG. 3
Deployment time
EFFICIENT DEPLOYMENT THROUGH DETERMINATION OF RESOURCE AND DEPLOYMENT STATUS
Pre-deployment time
PERFORMANCE PROFILE THROUGH PROGRAM ANALYSIS
50
Program
Analysis System
121
60a
60b
Performance estimation result in HOST
Performance estimation result in NIC (FAC)
Input
122
Deployment System
70
Deployment strategy
System view query
110
Cloud
110a
CSP's Private Cloud Service
110b
CSP's Control Plane
Server
Cloud Management Services
Master FAC
Resource Manager
111c
116
112c
117
111b
Server2 (Bare-metal)
114b
Agent
Server1 (Virtual)
Hypervisor
Agent
FAC (e.g., DPU)
Compression Accelerator
Agent
FAC (e.g., DPU)
Encryption Accelerator
Pattern Matching Accelerator
Agent
115c
112b
114d
115b
112a
111a
113
114a
115a
114c

50

PROGRAM

121

60a

60b

ANALYSIS SYSTEM

PERFORMANCE ESTIMATION RESULT IN HOST

PERFORMANCE ESTIMATION RESULT IN NIC (FAC)

FIG. 8

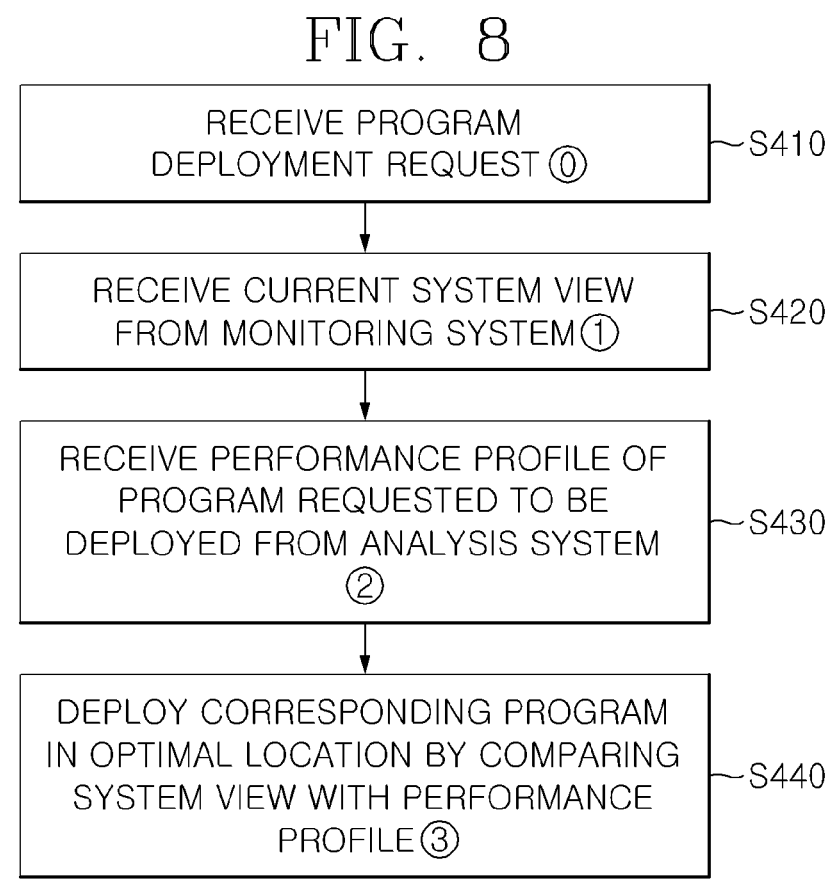

RECEIVE PROGRAM DEPLOYMENT REQUEST ⓪ — S410

RECEIVE CURRENT SYSTEM VIEW FROM MONITORING SYSTEM ① — S420

RECEIVE PERFORMANCE PROFILE OF PROGRAM REQUESTED TO BE DEPLOYED FROM ANALYSIS SYSTEM ② — S430

DEPLOY CORRESPONDING PROGRAM IN OPTIMAL LOCATION BY COMPARING SYSTEM VIEW WITH PERFORMANCE PROFILE ③ — S440

FIG. 10

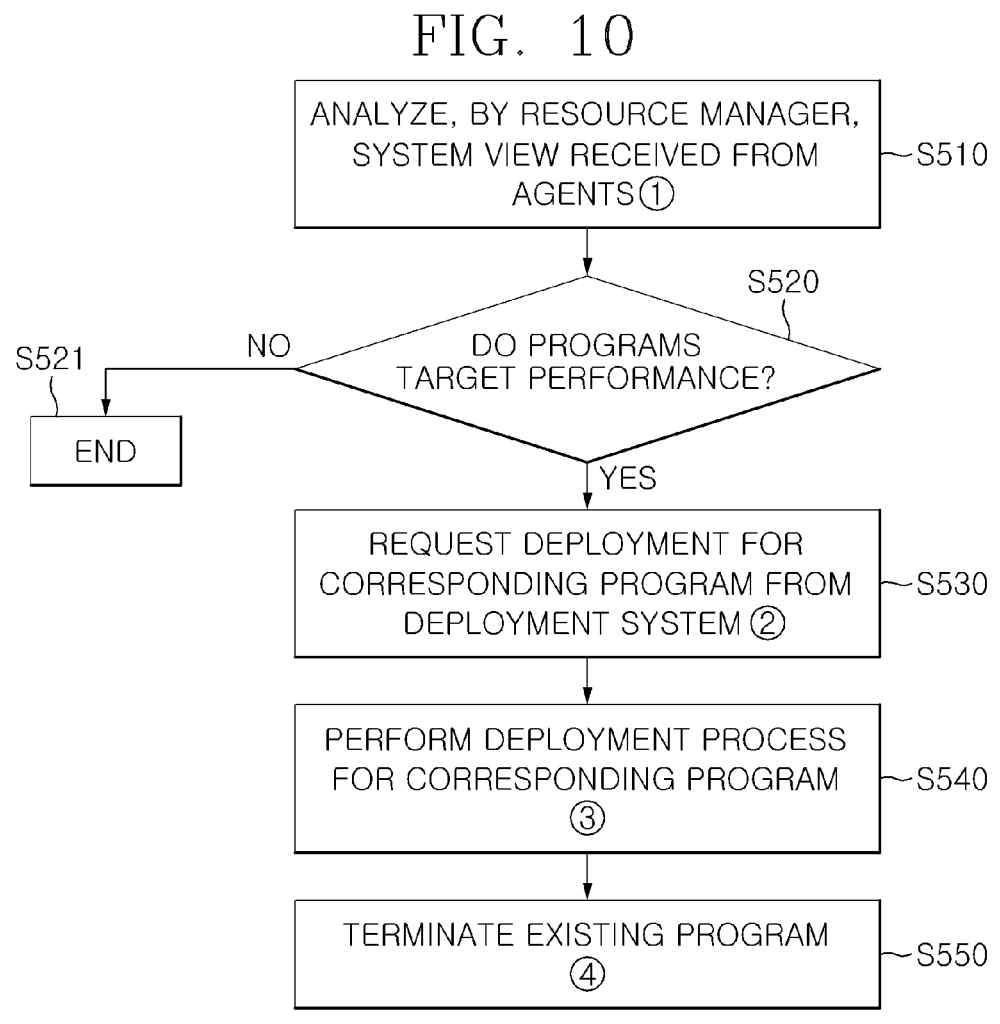

ANALYZE, BY RESOURCE MANAGER, SYSTEM VIEW RECEIVED FROM AGENTS ① S510

DO PROGRAMS TARGET PERFORMANCE? S520

NO

S521

END

YES

REQUEST DEPLOYMENT FOR CORRESPONDING PROGRAM FROM DEPLOYMENT SYSTEM ② S530

PERFORM DEPLOYMENT PROCESS FOR CORRESPONDING PROGRAM ③ S540

TERMINATE EXISTING PROGRAM ④ S550

METHOD, APPARATUS, SYSTEM AND COMPUTER PROGRAM FOR WORKLOAD DEPLOYMENT IN CLOUD SYSTEM INCLUDING FUNCTION ACCELERATOR CARD

CROSS-REFERENCE TO RELATED APPLICATION(S)

This application is based on and claims priority under 35 U.S.C. 119 to Korean Patent Application No. 10-2022-0167947, filed on Dec. 5, 2022, in the Korean Intellectual Property Office, the disclosure of which is herein incorporated by reference in its entirety.

BACKGROUND OF THE INVENTION

1. Field of the Invention

The present disclosure relates to a method, apparatus, system, and computer program for workload deployment in a cloud system including a function accelerator card, and more particularly to a method, apparatus, system, and computer program for workload deployment in a cloud system including a function accelerator card, which can efficiently perform workload deployment in the cloud system including the function accelerator card to increase the efficiency of the cloud system.

2. Description of the Prior Art

In recent years, cloud-related technologies that provide IT resources based on the Internet have been widely adopted, and various cloud services based on these technologies are rapidly growing.

More specifically, the cloud services are services that provide applications and system software driven based on multiple servers installed in data centers, or the like, based on a network.

Furthermore, recently, cloud service providers (CSPs) have been equipping each server in the data center with a function accelerator card (FAC) that can accelerate various functions such as network processing function, encryption function, data compression function, and the like, thereby enhancing the performance of each server and improving the efficiency of a cloud system.

However, in the conventional cloud system as described above, there was a problem in fully utilizing the overall resources of the cloud system such that a program using a specific function is fixedly deployed to a server capable of accelerating the specific function, and the load is concentrated on a specific server while resources of other servers are in an idle state.

Furthermore, conventionally, there was a restriction that the load could not be distributed more efficiently in consideration of changes in resource situations after deployment while deploying the program using the specific function to the specific server.

Accordingly, there is a continuous demand for a method of preventing load from being concentrated on a server capable of accelerating a specific function in a cloud environment, and further distributing the load more efficiently by considering the resource situation after deployment of the program, but a suitable solution for this has not yet been presented.

PRIOR ART LITERATURE

Patent Literature

Korean Patent Publication No. 10-2020-0011548 (2020.02.03)

SUMMARY OF THE INVENTION

The present disclosure has been made in order to solve the above-mentioned problems in the prior art and an aspect of the present disclosure is to provide a method, apparatus, system, and computer program for task deployment in a cloud system including a function accelerator card, which may prevent load from being concentrated on a specific function accelerator card capable of accelerating a specific function in a cloud environment.

Another aspect of the present disclosure is to provide a method, apparatus, system, and computer program for task deployment in a cloud system including a function accelerator card, which may more efficiently redistribute the load by considering the resource situation after deployment of a program.

The technical problem to be solved by the present disclosure is not limited to the technical problem mentioned above, and other technical problems which are not mentioned will be clearly by those having ordinary skill in the art to which the present disclosure pertains based on the following description.

In accordance with an aspect of the present disclosure, there is provided a task deployment method in a cloud system including one or more host servers and one or more function accelerator cards, which is performed by one or more processors in a task deployment apparatus, the task deployment method including: determining the status of each of available resources for the one or more host servers and the one or more function accelerator cards; calculating each of performance estimation values when the task to be deployed is executed in the one or more host servers or the one or more function accelerator cards under the condition of each of the available resources; and selecting the host servers or function accelerator cards in which the task is to be deployed in consideration of each of the performance estimation values.

Here, the determining may include generating overall system resource status information for the cloud system based on the status of available resources periodically collected using each of agents installed in the one or more host servers and the one or more function accelerator cards.

In addition, each of the agents may generate the overall system resource status information by transmitting information on the available resources collected at predetermined intervals to a resource manager of the cloud system.

In addition, each of the agents may periodically collect information on all resources, currently available resources, and resources currently occupied by other tasks for each of the one or more host servers and the one or more function accelerator cards, and transmit the collected information to the resource manager.

In addition, the selecting may include, when a deployment request for the task is received, receiving the current overall system resource status information, and comparing the received status information with each of the performance estimation values to select the host servers or function accelerator cards in which the task is to be deployed.

In addition, a first task that does not meet target performance may be selected from already deployed tasks, and the first task may be re-deployed by being subjected to the determining, the calculating, and the selecting.

In addition, the task deployment apparatus may be implemented as a separate server that is separated from the cloud system and interoperates through a communication network.

In addition, in the determining, the task deployment apparatus may request the overall system resource status information from the resource manager of the cloud system, and receive the requested information.

In addition, the task deployment method may further include calculating and storing a required resource estimation value and a performance estimation value according to the required resource estimation value, respectively, when one or more tasks are deployed in the one or more host servers and the one or more function accelerator cards.

At this time, overall task performance profile information may be configured by combining the one or more tasks for each of the one or more host servers and the one or more function accelerator cards and for each of the required resource estimation values, and calculating and storing each of the performance estimation values according to each combination.

In addition, the resource manager may be driven by a function accelerator card mounted on a control server of the cloud system.

In accordance with another aspect of the present disclosure, there is provided a computer-readable storage medium storing instructions that cause, when executed by a processor, an apparatus including the processor to implement operations for task deployment in a cloud system including one or more host servers and one or more function accelerator cards, wherein the operations may include: determining the status of each of available resources for the one or more host servers and the one or more function accelerator cards; calculating each of performance estimation values when the task to be deployed is executed in the one or more host servers or the one or more function accelerator cards under the condition of each of the available resources; and selecting the host servers or function accelerator cards in which the task is to be deployed in consideration of each of the performance estimation values.

In accordance with still another aspect of the present disclosure, there is provided a task deployment apparatus that includes a processor and deploys tasks for a cloud system having one or more host servers and one or more function accelerator cards, wherein the processor performs operations of: determining the status of each of available resources for the one or more host servers and the one or more function accelerator cards; calculating each of performance estimation values when the task to be deployed is executed in the one or more host servers or the one or more function accelerator cards under the condition of each of the available resources; and selecting the host servers or function accelerator cards in which the task is to be deployed in consideration of each of the performance estimation values.

At this time, the determining may include generating overall system resource status information for the cloud system based on the status of available resources periodically collected using each of agents installed in the one or more host servers and the one or more function accelerator cards.

In addition, each of the agents may generate the overall system resource status information by transmitting information on the available resources collected at predetermined intervals to a resource manager of the cloud system.

In addition, each of the agents may periodically collect information on all resources, currently available resources, and resources currently occupied by other tasks for each of the one or more host servers and the one or more function accelerator cards, and transmit the collected information to the resource manager.

In addition, the selecting may include, when a deployment request for the task is received, receiving the current overall system resource status information, and comparing the received status information with each of the performance estimation values to select the host servers or function accelerator cards in which the task is to be deployed.

At this time, a first task that does not meet target performance may be selected from already deployed tasks, and the first task may be re-deployed by being subjected to the determining, the calculating, and the selecting.

In addition, the determining may include requesting the overall system resource status information from the resource manager of the cloud system, and receiving the requested information.

The processor may further perform an operation of selecting and re-deploying a first task that does not meet target performance from already deployed tasks.

As described above, according to an embodiment of the present disclosure, in a method, apparatus, system, and computer program for task deployment in a cloud system, it is possible to prevent load from being concentrated on a specific function accelerator card capable of accelerating a specific function in a cloud environment.

In addition, according to an embodiment of the present disclosure, in a method, apparatus, system, and computer program for task deployment in a cloud system, it is possible to redistribute the load more efficiently by considering the resource situation after program deployment.

The effects obtainable in the present disclosure are not limited to the effects mentioned above, and other effects not mentioned may be clearly understood by those skilled in the art from the contents described in this specification.

BRIEF DESCRIPTION OF THE DRAWINGS

The accompanying drawings, which are included as part of the detailed description to aid understanding of the present disclosure, provide embodiments of the present disclosure, and describe the technical features of the present disclosure together with the detailed description.

FIGS. 3 to 11 are diagrams illustrating specific operations of a task deployment method in a cloud system according to an embodiment of the present disclosure.

DETAILED DESCRIPTION OF THE EXEMPLARY EMBODIMENTS

Figure 1:
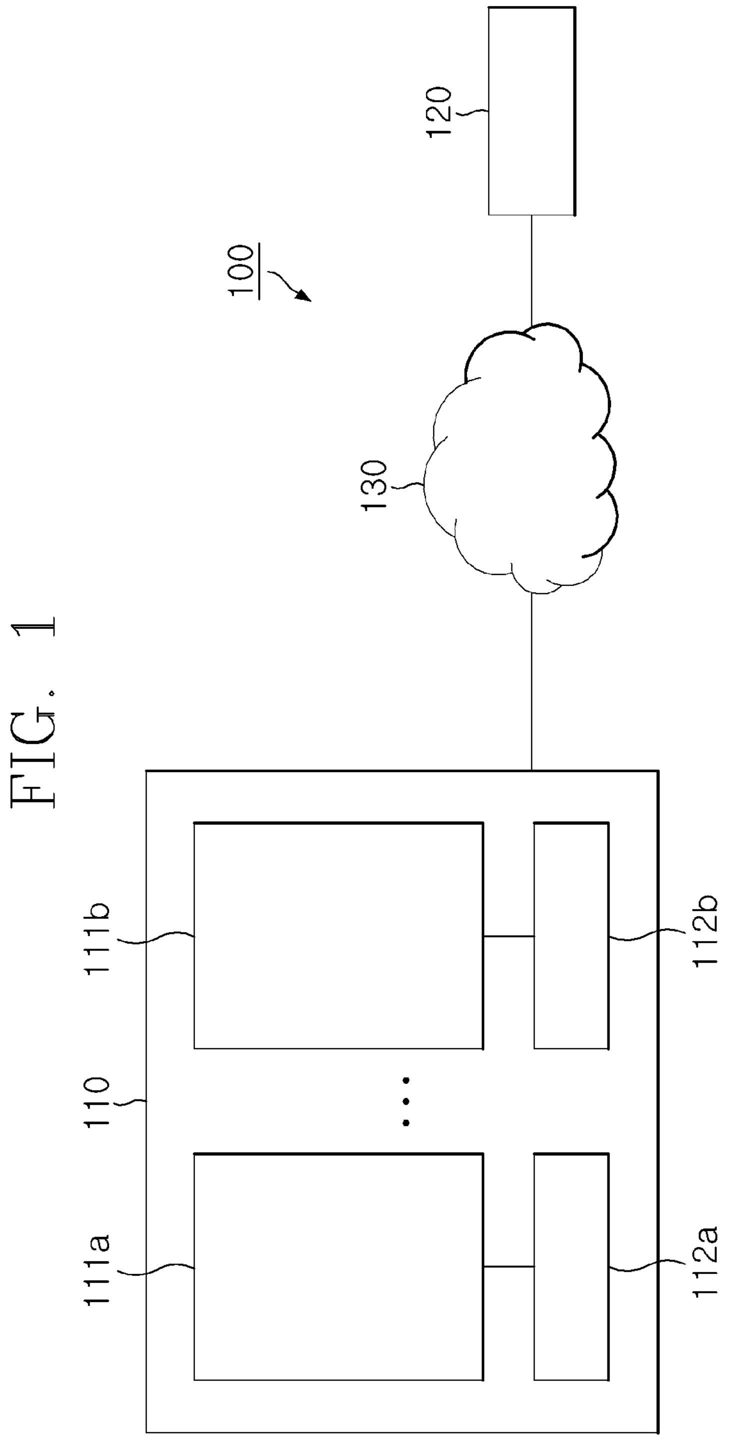
FIG. 1 is a diagram illustrating a task deployment system in a cloud system according to an embodiment of the present disclosure.

Hereinafter, embodiments disclosed in the present specification will be described in detail with reference to the accompanying drawings. Objects, specific advantages, and novel features of the present disclosure will become more apparent from the following detailed description and preferred embodiments associated with the accompanying drawings.

Prior to this, terms or words used in the present specification and claims should not be construed as being limited to the common or dictionary meanings, and the inventors should properly explain the concept of terms in order to best explain their own invention. Based on the principle that can be defined, it should be interpreted as meaning and concept corresponding to the technical idea of the present disclosure.

In assigning reference numerals to components of each drawing, the same or similar components are assigned the same reference numerals regardless of reference numerals, and overlapping descriptions thereof will be omitted. The suffixes "module" and "unit" for the components used in the following description are given or mixed in consideration of only the ease of writing the specification, and do not have distinct meanings or roles by themselves, and may mean software or hardware components.

In describing the components of the present disclosure, it should be understood that the singular expression includes the plural expression unless the context clearly dictates otherwise. In addition, terms such as "first" and "second" are used to distinguish one component from another component, and the components are not limited by the terms. In addition, when a certain component is referred to as being "connected" to another component, it may be directly connected or linked to the other component, but it should be understood that other components may exist in between.

In addition, in describing the embodiments disclosed in the present specification, if it is determined that detailed descriptions of related known technologies may obscure the gist of the embodiments disclosed in the present specification, the detailed description thereof will be omitted. In addition, the accompanying drawings are only for easy understanding of the embodiments disclosed in the present specification, and the technical idea disclosed in the present specification is not limited by the accompanying drawings, and should be understood to include all changes, equivalents, or substitutes included in the spirit and scope of the present specification.

Hereinafter, exemplary embodiments of a method, apparatus, system, and computer program for task deployment in a cloud system according to the present disclosure will be described in detail with reference to the accompanying drawings.

First, FIG. 1 illustrates the configuration and operation of a task deployment system 100 according to an embodiment of the present disclosure. As can be seen in FIG. 1, the task deployment system 100 according to an embodiment of the present disclosure may include a cloud system 110, and a task deployment apparatus 120 that performs task deployment for one or more host servers 111*a* and 111*b* and one or more function accelerator cards 112*a* and 112*b* which are provided in the cloud system 110.

Here, the cloud system 110 may be configured to include the one or more host servers 111*a* and 111*b* and the one or more function accelerator cards 112*a* and 112*b*.

In this case, it is not necessary for all of the one or more host servers 111*a* and 111*b* to be equipped with one or more function accelerator cards 112*a* and 112*b*, and some of the host servers 111*a* and 111*b* may be equipped with a general network interface card or the like.

In addition, although FIG. 1 illustrates an example of a cloud service provided by a cloud service provider (CSP) for the cloud system 110, the present disclosure is not necessarily limited thereto. In addition, the present disclosure can be applied for task deployment in various environments such as on-premise environment, etc.

In addition, the task deployment apparatus 120 may be implemented using one or two or more servers, but the present disclosure is not necessarily limited thereto. In addition, the task deployment apparatus 120 may be configured using a personal computer processing device such as a desktop computer, laptop, tablet, or smartphone, or may be implemented in various forms such as a dedicated device that performs a series of processes for task deployment.

In addition, as a communication network 130 connecting the cloud system 110 and the task deployment apparatus 120 in FIG. 1, a wired network and a wireless network may be used. Specifically, the communication network 130 may include various communication networks such as a local area network (LAN), a metropolitan area network (MAN), a wide area network (WAN), etc. In addition, the communication network 130 may include the well-known world wide web (WWW). Furthermore, the communication network 130 may be implemented using a data bus configured to transmit and receive data.

In addition, according to the present disclosure, in the task deployment system 100, the task deployment apparatus 120 and the cloud system 110 do not necessarily transmit and receive data through the communication network 130. Specifically, the task deployment apparatus 120 and the cloud system 110 can be implemented in various forms in which some or all of the components of the task deployment apparatus 120 are configured integrally with the cloud system 110, and the like.

Figure 2:
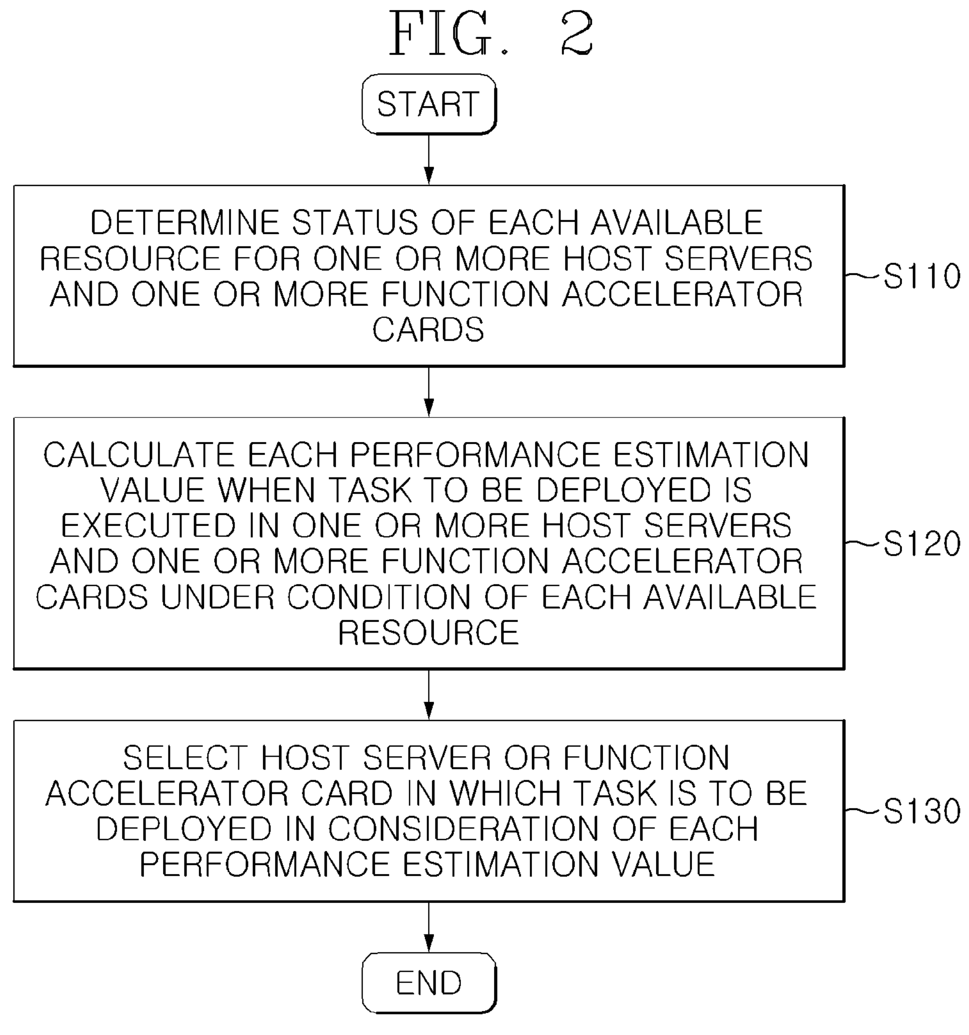
FIG. 2 is a flowchart illustrating a task deployment method in a cloud system according to an embodiment of the present disclosure.

FIG. 2 is a flowchart illustrating a task deployment method in the cloud system 110 according to an embodiment of the present disclosure, and FIG. 3 illustrates the configuration and operation of the cloud system 110 and the task deployment apparatus 120 according to an embodiment of the present disclosure.

Here, the method illustrated in FIG. 2 may be performed, for example, by the task deployment apparatus 120. Furthermore, the task deployment apparatus 120 may be implemented by including a computing device described below with reference to FIG. 13. For example, the task deployment apparatus 120 may include a processor 10, and the processor 10 may perform task deployment by executing a command configured to implement an operation for performing task deployment.

First, as illustrated in FIG. 2, a task deployment method in the cloud system 110 according to an embodiment of the present disclosure, which is performed by one or more processors in the task deployment apparatus 110 to deploy a task 50 in the cloud system 110 including the one or more host servers 111*a* and 111*b* and the one or more function accelerator cards 112*a* and 112*b*, may include determining (S110) the status of each of available resources for the one or more host servers 111*a* and 111*b* and the one or more function accelerator cards 112*a* and 112*b*; calculating (S120) each of performance estimation values when the task 50 to be deployed is executed in the one or more host servers 111*a* and 111*b* or the one or more function accelerator cards 112*a* and 112*b* under the condition of each of the available resources; and selecting (S130) the host servers 111*a* and 111*b* or function accelerator cards 112*a* and 112*b* in which the task 50 is to be deployed in consideration of each of the performance estimation values.

Here, the determining S110 may include generating overall system resource status information for the cloud system 110 based on the status of available resources periodically collected using each of agents 114*a* and 114*b* installed in the one or more host servers 111*a* and 111*b* and the one or more function accelerator cards 112*a* and 112*b*.

In addition, each of the agents 114*a* and 114*b* may generate the overall system resource status information by transmitting information on the available resources collected at predetermined intervals to a resource manager 117 of the cloud system 110.

In addition, each of the agents 114*a* and 114*b* may periodically collect information on all resources, currently available resources, and resources currently occupied by other tasks for each of the one or more host servers 111*a* and 111*b* and the one or more function accelerator cards 112*a* and 112*b*, and transmit the collected information to the resource manager 117.

In addition, the selecting S130 may include, when a deployment request for the task 50 is received, receiving the current overall system resource status information, and comparing the received status information with each of the performance estimation values to select the host servers 111*a* and 111*b* or function accelerator cards 112*a* and 112*b* in which the task 50 is to be deployed.

In addition, a first task that does not meet target performance may be selected from already deployed tasks 50, and the first task may be re-deployed by being subjected to the determining S110, the calculating S120, and the selecting S130.

In addition, the task deployment apparatus 120 may be implemented as a separate server that is separated from the cloud system 110 and interoperates through a communication network 130.

In addition, in the determining S110, the task deployment apparatus 120 may request the overall system resource status information from the resource manager 117 of the cloud system 110, and receive the requested information.

In addition, the task deployment method may further include calculating and storing (not shown) a required resource estimation value and a performance estimation value according to the required resource estimation value, respectively, when one or more tasks are deployed in the one or more host servers 111*a* and 111*b* and the one or more function accelerator cards 112*a* and 112*b*.

At this time, overall task performance profile information may be configured by combining the one or more tasks 50 for each of the one or more host servers 111*a* and 111*b* and the one or more function accelerator cards 112*a* and 112*b* and for each of the required resource estimation values, and calculating the performance estimation value according to each combination.

In addition, the resource manager 117 may be driven by a function accelerator card 112*c* mounted on a control server 111*c* of the cloud system 110.

Accordingly, in a method, apparatus, system, and computer program for task deployment in the cloud system 110 according to an embodiment of the present disclosure, it is possible to prevent load from being concentrated on a specific function accelerator card capable of accelerating a specific function in a cloud environment, and to redistribute the load more efficiently by considering the resource situation after program deployment.

Hereinafter, with reference to FIGS. 2 and 3, a task deployment method in a cloud system according to an embodiment of the present disclosure will be described in more detail.

First, in the determining S110, the task deployment apparatus 120 may determine the status of each of available resources for the one or more host servers 111*a* and 111*b* and the one or more function accelerator cards 112*a* and 112*b*.

More specifically, as illustrated in FIG. 3, agents 114*a*, 114*b*, 114*c*, and 114*d* may be installed in the one or more host servers 111*a* and 111*b* and the one or more function accelerator cards 112*a* and 112*b* constituting the cloud system 110, and periodically confirm each of the available resources for the one or more host servers 111*a* and 111*b* and the one or more function accelerator cards 112*a* and 112*b* to transmit the confirmed resources to the resource manager 117 driven in a function accelerator card 112*c* mounted on a control server 111*c* of the cloud system 110.

Accordingly, a task deployment unit 122 of the task deployment apparatus 120 may receive the status of each of available resources for the one or more host servers 111*a* and 111*b* and the one or more function accelerator cards 112*a* and 112*b* from the resource manager 117.

Next, in the calculating S120, the task deployment apparatus 120 may calculate each of performance estimation values when the task 50 to be deployed is executed in the one or more host servers 111*a* and 111*b* or the one or more function accelerator cards 112*a* and 112*b* under the condition of each of the available resources.

In this case, in the present disclosure, the task 50 may be a program or script that can be driven in the host servers 111*a* and 111*b* or function accelerator cards 112*a* and 112*b* of the cloud system 110, but the present disclosure is not necessarily limited thereto. In addition, as the task 50, various types of objects that can be executed in the host servers 111*a* and 111*b* or the function accelerator cards 112*a* and 112*b*, such as processes and containers, can be used.

To this end, as can be seen in FIG. 3, a task analysis unit 121 of the task deployment apparatus 120 may calculate performance evaluation results 60*a* and 60*b* obtained through analysis of the task 50 executed in the host server 111*a* and 111*b* and in the function accelerator cards 112*a* and 112*b*, respectively, and calculate each of the performance estimation values for the task 50 based on the calculated performance evaluation results 60*a* and 60*b*.

Accordingly, in the selecting S130, the task deployment apparatus 120 may select the host servers 111*a* and 111*b* and function accelerator cards 112*a* and 112*b* in which the task 50 is to be deployed in consideration of each of the performance estimation values.

More specifically, in FIG. 3, when a deployment request for the task 50 is received, the task deployment apparatus 120 may receive the current overall system resource status information from the resource manager 117, and compare the received status information with each of the performance estimation values to select the host servers 111*a* and 111*b* or function accelerator cards 112*a* and 112*b* in which the task is to be deployed.

Accordingly, in a method, apparatus, system, and computer program for task deployment in the cloud system 110 according to an embodiment of the present disclosure, it is possible to prevent load from being concentrated on a specific function accelerator card capable of accelerating a specific function in a cloud environment, and to redistribute the load more efficiently by considering the resource situation after the deployment of the task 50.

Hereinafter, with reference to each drawing, a task deployment method in the cloud system 110 according to an embodiment of the present disclosure will be described in more detail.

Figures 4, 5:
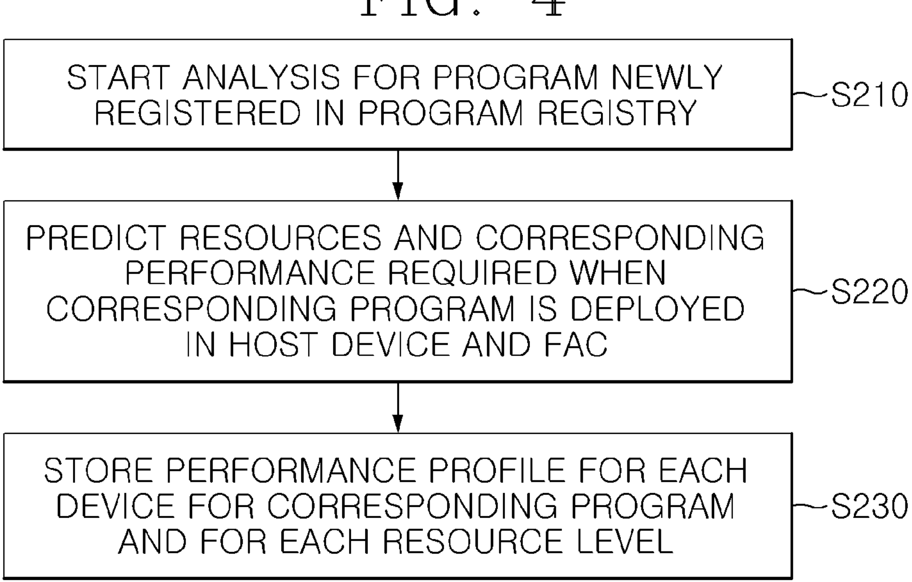

First, in FIGS. 4 and 5, a task analysis process performed before the deployment of the task 50 is described.

In this case, as can be seen in FIG. 4, in operation S210, the task deployment apparatus 120 may start an analysis task for a newly registered program or the like in a program registry.

Next, in operation S220, the task deployment apparatus 120 may predict required resources and corresponding performance when the program is distributed to the host servers 111*a* and 111*b* or the function accelerator cards 112*a* and 112*b*.

Accordingly, in operation S230, the task deployment apparatus 120 may generate and store a performance profile for each of the host servers 111*a* and 111*b* or the function accelerator cards 112*a* and 112*b* for the program and for each resource level.

At this time, the reason for evaluating the performance of the program for each of the host servers 111*a* and 111*b* and the function accelerator cards 112*a* and 112*b* is to determine in advance the level of performance exerted by the program in the host servers 111*a* and 111*b* and the function accelerator cards 112*a* and 112*b* so that the optimal location for deployment can be selected.

More specifically, in a case in which a specific program can be executed faster with fewer resources when the specific program is executed in the function accelerator cards 112*a* and 112*b* than when the specific program is executed in the host servers 111*a* and 111*b*, it is preferable that the program be deployed in the function accelerator cards 112*a* and 112*b*.

In addition, when the function accelerator cards 112*a* and 112*b* are already executing other programs and there is insufficient available resources, the program may need to be initially executed in the host servers 111*a* and 111*b*. However, in this case, since the result value of execution performance may be lower than a performance target value, when the available resources of the function accelerator cards 112*a* and 112*b* become sufficient through periodic monitoring, the program may be migrated to the function accelerator cards 112*a* and 112*b*.

More specifically, static analysis and dynamic analysis may be used as performance measurement methods for the host servers 111*a* and 111*b* and the function accelerator cards 112*a* and 112*b*, but the present disclosure is not necessarily limited thereto.

In addition, the performance profile is a performance estimation value according to the size of allocated resource. For example, when the number of cores is X, execution performance may be configured in the form of X Mpps.

Figure 6:
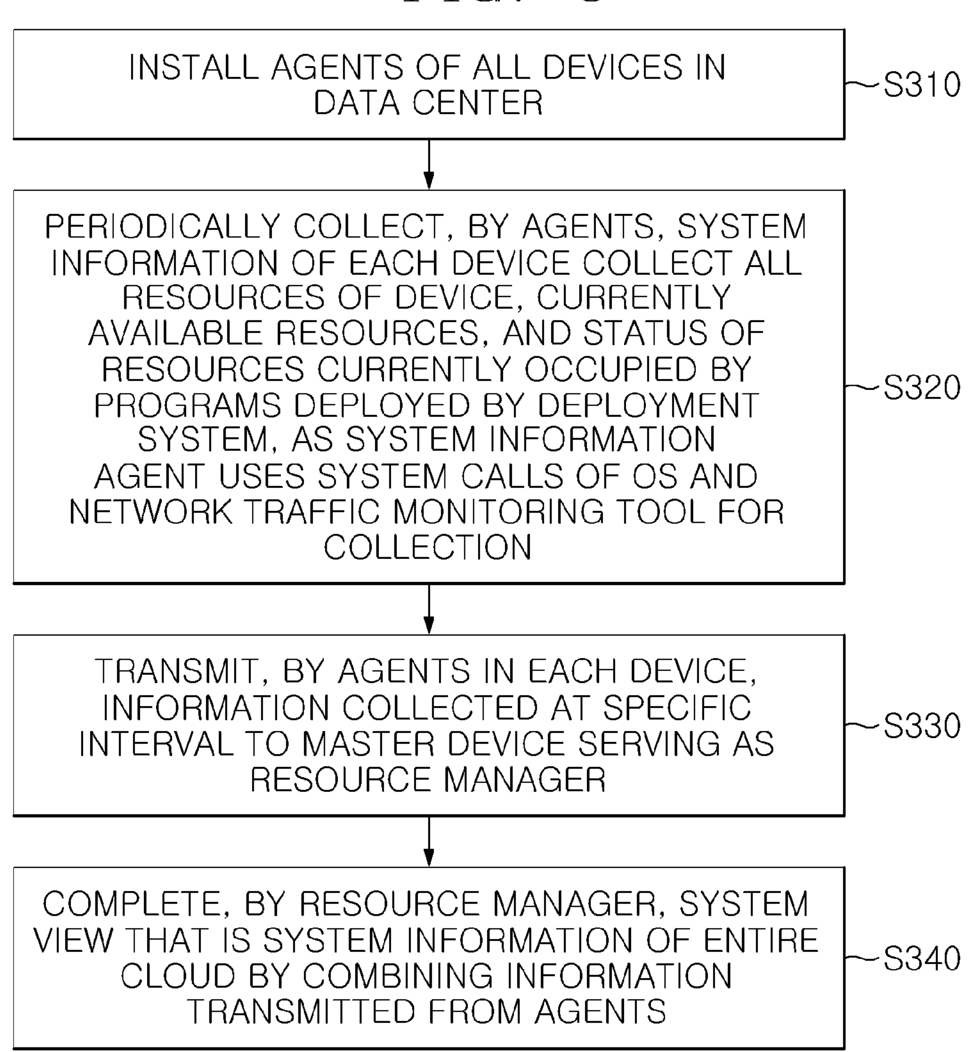
Figure 7:
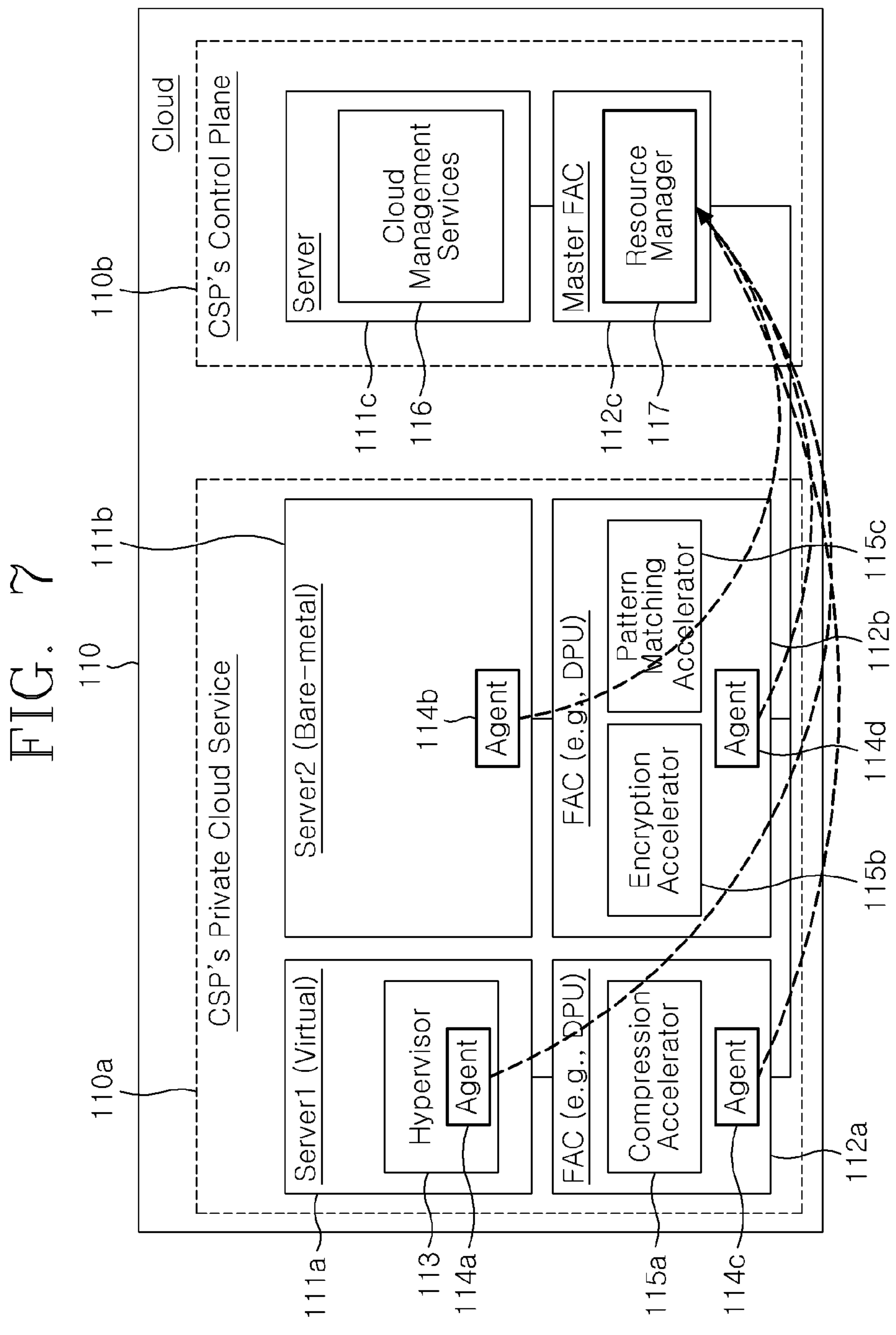

In addition, in FIGS. 6 and 7, a monitoring process performed prior to the deployment of the task 50 is descried.

First, as illustrated in FIG. 6, in operation S310, agents 114*a*, 114*b*, 114*c*, and 114*d* may be installed in the host servers 111*a* and 111*b* and the function accelerator cards 112*a* and 112*b* of the cloud system 110, respectively.

Next, in operation S320, the agents 114*a*, 114*b*, 114*c*, and 114*d* may periodically collect information on each of the host servers 111*a* and 111*b* and the function accelerator cards 112*a* and 112*b*.

In this case, the collected information may include information on all resources, currently available resources, and resources currently occupied by another task 50.

More specifically, the agents 114*a*, 114*b*, 114*c*, and 114*d* may use a system call of an operating system and a network traffic monitoring tool to collect the above-mentioned information.

In addition, in operation S330, the agents 114*a*, 114*b*, 114*c*, and 114*d* may transmit the collected information to a master server 111*c*, which performs the role of resource management, at predetermined intervals.

Accordingly, in operation S340, the resource manager 117 of the master server 111*c* may generate overall system resource status information for the cloud system 110 based on the information transmitted from the agents 114*a*, 114*b*, 114*c*, and 114*d*.

Here, the overall system resource status information may include information such as available resources and all resources of the respective host servers 111*a* and 111*b* and function accelerator cards 112*a* and 112*b* constituting a cluster of the cloud system 110. In addition, the overall system resource status information may also include information on the status of resources occupied by each task 50 deployed by the task deployment apparatus 120 (e.g., CPU, memory, traffic profile {packet size, # of flows, IP address distribution, etc.}).

Figure 9:
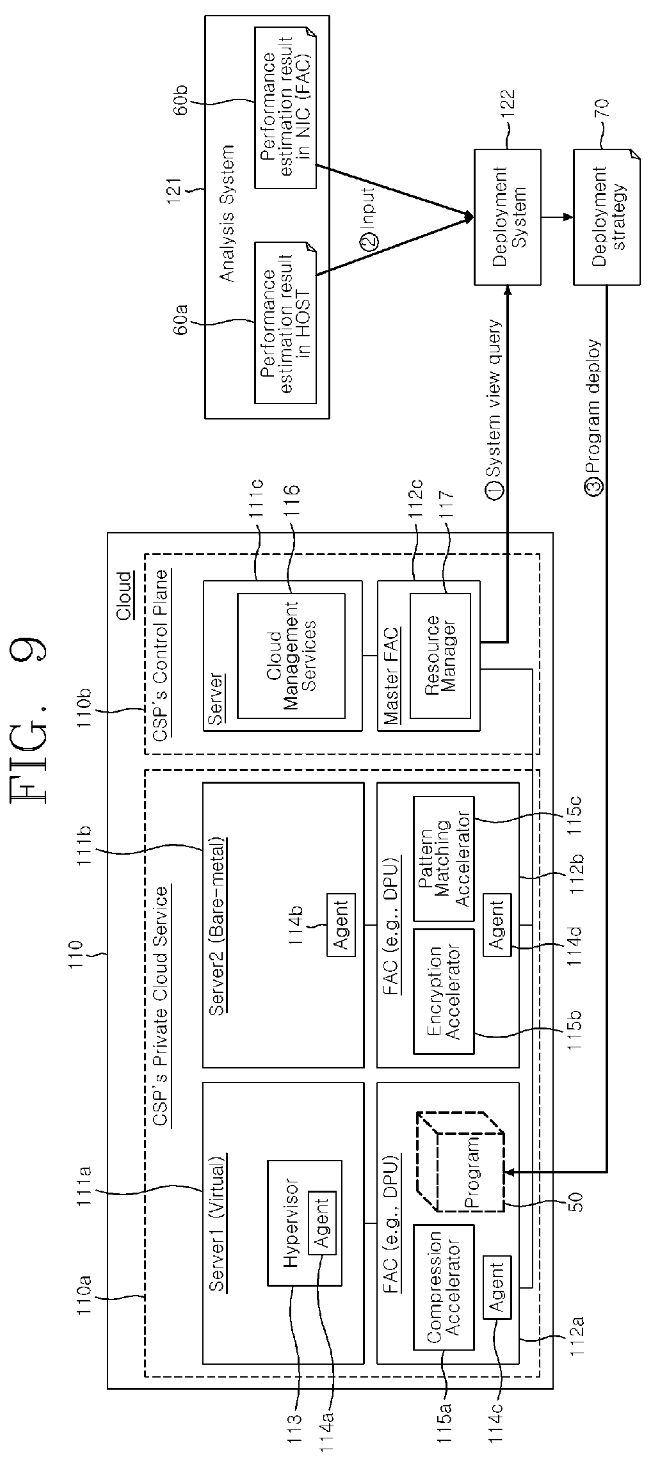

In addition, in FIGS. 8 and 9, a process of deploying the task 50 is described.

First, as can be seen in FIG. 8, when a deployment request for the specific task 50 is received in operation S410, in operation S420, the task deployment apparatus 120 may receive the current overall system resource status information (system view of FIG. 9) from a monitoring system such as the resource manager 117 or the like as shown in ① of FIG. 9.

Next, in operation S430, as shown in ② of FIG. 9, a performance profile for the task 50 requested to be deployed, from an analysis system such as the task analysis unit 121.

Accordingly, in operation S440, as shown in ③ of FIG. 9, the task 50 may be deployed in an optimal position by comparing the overall system resource status information (system view) with the performance profile.

Figure 11:
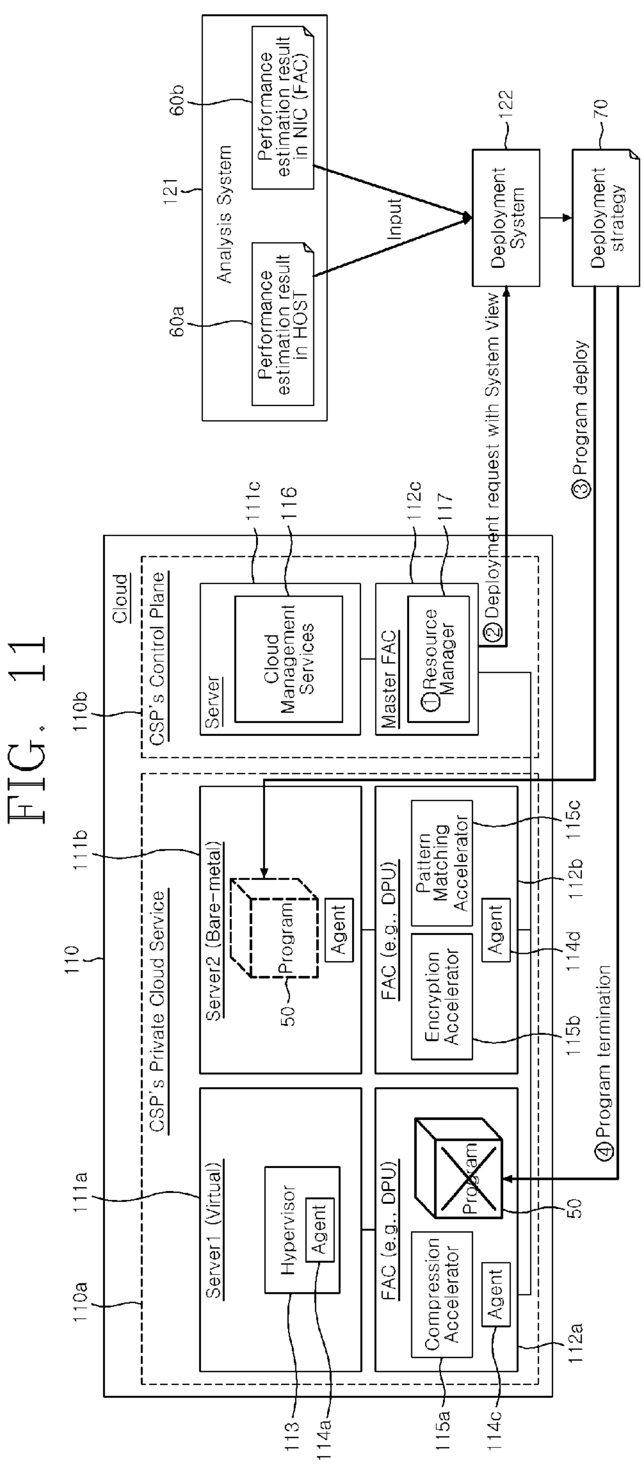

In addition, in FIGS. 10 and 11, a process of migrating the task 50 is described.

First, as shown in ① of FIG. 10, the resource manager 117 may analyze information received from each of the agent 114*a*, 114*b*, 114*c*, 114*d* in operation S510 to determine whether each of the tasks 50 satisfies a target performance in operation S520.

At this time, when all of the tasks 50 satisfy the target performance, the corresponding process may be terminated without additional re-deployment in operation S521, but when one or more tasks 50 do not satisfy the target performance, as shown in ② of FIG. 10, re-deployment for the corresponding task 50 may be requested from the task deployment unit 122 of the task deployment apparatus 120 in operation S530.

Accordingly, in operation S540, as shown in ③ of FIG. 10, the task deployment unit 122 of the task deployment apparatus 120 may re-deploy the corresponding task 50.

In addition, in operation S550, as shown in ④ of FIG. 10, the task deployment unit 122 of the task deployment apparatus 120 may terminate the existing task 50 that has been re-deployed.

Accordingly, in a method, apparatus, system, and computer program for task deployment in the cloud system 110 according to an embodiment of the present disclosure, it is possible to prevent load from being concentrated on a specific function accelerator card capable of accelerating a specific function in a cloud environment, and to redistribute the load more efficiently by considering the resource situation after the deployment of the program.

In addition, a computer-readable storage medium according to another embodiment of the present disclosure may store instructions that cause, when executed by a processor, an apparatus including the processor to implement operations for task deployment in a cloud system including one or more host servers and one or more function accelerator cards, wherein the operations may include: determining the status of each of available resources for the one or more host servers and the one or more function accelerator cards; calculating each of performance estimation values when the task to be deployed is executed in the one or more host servers or the one or more function accelerator cards under the condition of each of the available resources; and selecting the host servers or function accelerator cards in which the task is to be deployed in consideration of each of the performance estimation values. In this case, a computer program stored in the storage medium may be a computer program stored in a computer-readable medium in order to execute each operation of the task deployment method in the above-described cloud system 110 in the computer. Here, the computer program may be a computer program including a machine language code generated by a compiler and a computer program including a high-level language code that can be executed on a computer using an interpreter or the like. At this time, the computer is not limited to a personal computer (PC) or a laptop computer, etc., and includes any information processing device having a central processing unit (CPU) to execute the computer program, such as a server, a smartphone, a tablet PC, a PDA, a mobile phone, etc.

In addition, the computer-readable storage medium may continuously store programs executable by the computer or temporarily store the programs for execution or download. In addition, the medium may be various recording means or storage means in the form of a single or a plurality of hardware components combined, but is not limited to a medium directly connected to a certain computer system, and may be distributed on a network. Accordingly, the foregoing detailed description should not be interpreted as restrictive in all aspects, and should be considered as illustrative. The scope of the present disclosure should be determined by rational interpretation of the appended claims, and all changes within the equivalent scope of the present disclosure are included in the scope of the present disclosure.

Figure 12:
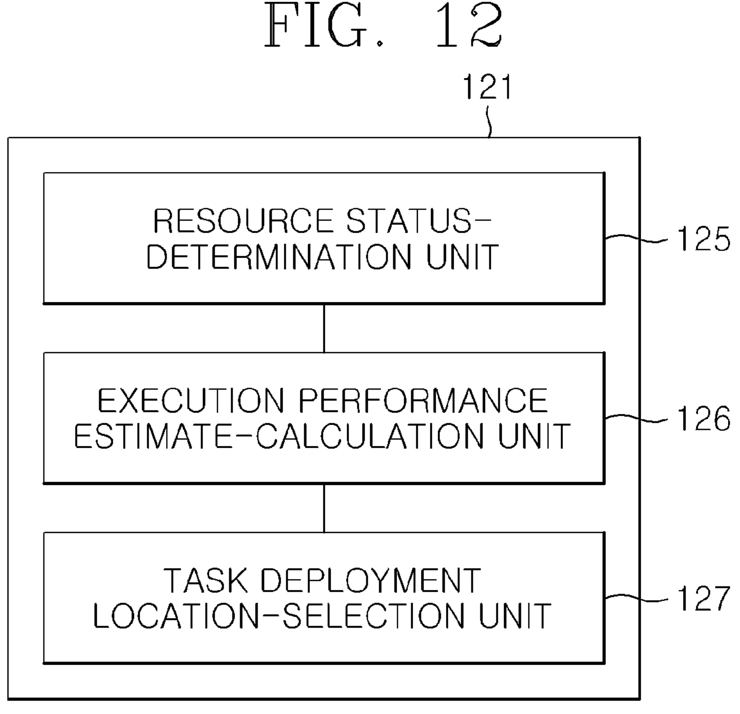
FIG. 12 is a block diagram illustrating a task deployment apparatus according to another embodiment of the present disclosure.

FIG. 12 is a block diagram illustrating the task deployment apparatus 120 in the cloud system 110 according to an embodiment of the present disclosure.

As can be seen in FIG. 12, the task deployment apparatus 120 according to an embodiment of the present disclosure may include a resource status-determination unit 125, an execution performance estimate-calculation unit 126, and a task deployment location-selection unit 127.

In addition, according to an embodiment of the present disclosure, the task deployment apparatus 120 may be implemented by including a computing device described below with reference to FIG. 13. For example, the processor 10 may execute a command configured to implement an operation for correcting table coordinate information, and the operation may include each operation of the resource status-determination unit 125, the execution performance estimate-calculation unit 126, and the task deployment location-selection unit 127.

Hereinafter, the task deployment apparatus 120 according to an embodiment of the present disclosure that is divided for each component will be described. Here, more detailed information about the task deployment apparatus 120 according to an embodiment of the present disclosure can be inferred from the description of the task deployment method in the cloud system 110 according to an embodiment of the present disclosure described above, and thus detailed description thereof will be omitted.

First, the resource status-determination unit 125 may determine the status of each of available resources for the one or more host servers 111*a* and 111*b* and the one or more function accelerator cards 112*a* and 112*b*.

In addition, the execution performance estimate-calculation unit 126 may calculate each of performance estimation values when the task 50 to be deployed is executed in the one or more host servers 111*a* and 111*b* or the one or more function accelerator cards 112*a* and 112*b* under the condition of each of the available resources.

Finally, the task deployment location-selection unit 127 may select the host servers 111*a* and 111*b* or the function accelerator cards 112*a*, 112*b* in which the task 50 is to be deployed in consideration of each of the performance estimation values.

Here, the resource status-determination unit 125 may generate overall system resource status information on the cloud system 110 based on the status of the available resources periodically collected using each of the agents 114*a*, 114*b*, 114*c*, and 114*d* installed in the one or more host servers 111*a* and 111*b* and the one or more function accelerator cards 112*a* and 112*b*.

In addition, each of the agents 114*a*, 114*b*, 114*c*, and 114*d* may transmit information on the available resources collected at predetermined intervals to the resource manager 117 of the cloud system 110 to generate the overall system resource status information.

In addition, each of the agents 114*a*, 114*b*, 114*c*, and 114*d* may periodically collect information on all resources, currently available resources, and resources currently occupied by other tasks for each of the one or more host servers 111*a* and 111*b* and the one or more function accelerator cards 112*a* and 112*b*, and transmit the collected information to the resource manager 117.

In addition, when a deployment request for the task 50 is received, the task deployment location-selection unit 127 may receive the current overall system resource status information, and compare the received status information with each of the performance estimation values to select the host servers 111*a* and 111*b* or function accelerator cards 112*a* and 112*b* in which the task is to be deployed.

In addition, the task deployment apparatus 120 may further include a task re-deployment unit (not shown) that selects and re-deploys a first task that does not satisfy a target performance among the already deployed tasks 50.

In addition, the task deployment apparatus 120 may be implemented as a separate server that is separated from the cloud system 110 and interoperates through the communication network 130.

In addition, the resource status-determination unit 125 may request and receive the overall system resource status information from the resource manager 117 of the cloud system 110.

In addition, when one or more tasks are deployed in the one or more host servers 111*a* and 111*b* and the one or more function accelerator cards 112*a* and 112*b*, a required resource estimation value and a performance estimation value according to the required resource estimation value may be calculated and stored, respectively.

At this time, overall task performance profile information may be configured by combining the one or more tasks for each of the one or more host servers 111*a* and 111*b* and the one or more function accelerator cards 112*a* and 112*b* and for each of the required resource estimation values, and calculating the performance estimation value according to each combination.

In addition, the resource manager 117 may be driven in a function accelerator card 112*c* mounted in the control server 111*c* of the cloud system 110.

Figure 13:
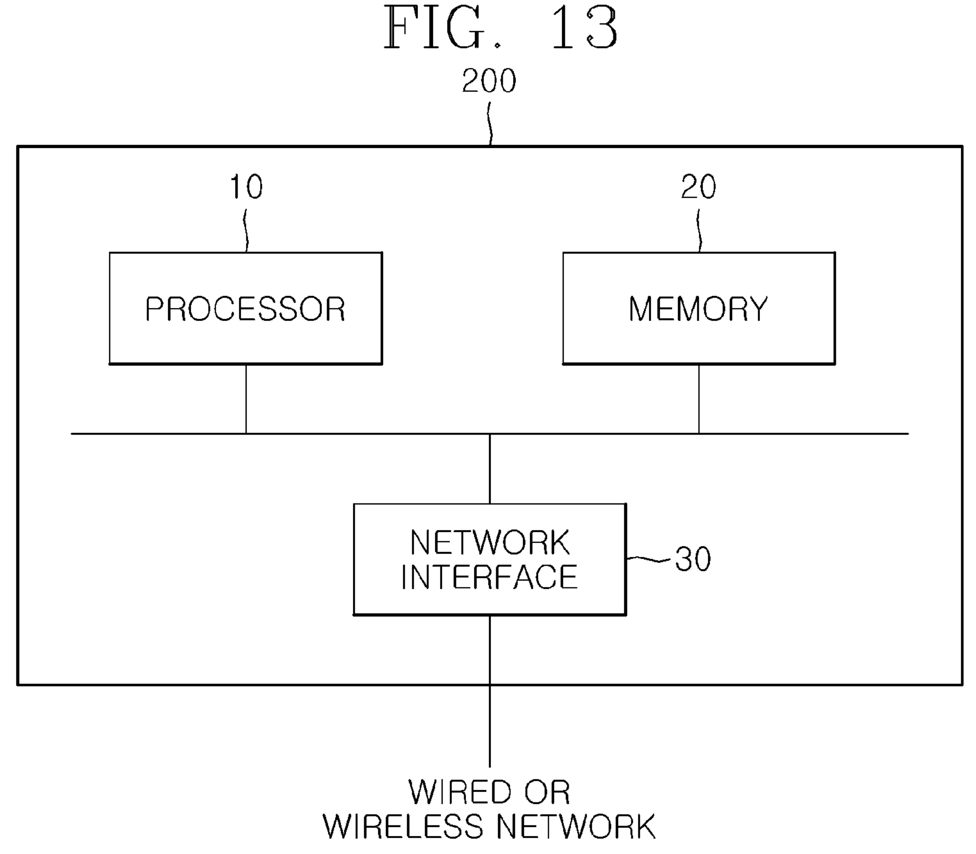
FIG. 13 is a diagram illustrating a specific configuration of a task deployment apparatus according to another embodiment of the present disclosure.

FIG. 13 illustrates an apparatus 200 to which the proposed method of the present disclosure can be applied.

Referring to FIG. 13, the apparatus 200 may be configured to implement a task deployment process in the cloud system 110 according to the proposed method of the present disclosure. For example, the apparatus 200 is the task deployment apparatus 120 for deploying the task 50 in the one or more host servers 111*a* and 111*b* and one or more function accelerator cards 112*a* and 112*b* constituting the cloud system 110.

For example, the apparatus 200 to which the proposed method of the present disclosure can be applied may include network devices such as repeaters, hubs, bridges, switches, routers, and gateways, computer devices such as desktop computers and workstations, mobile terminals such as smartphones, portable devices such as laptop computers, home appliances such as digital TVs, and mobile means such as automobiles. As another example, the apparatus 200 to which the present disclosure can be applied may be included as a part of an application specific integrated circuit (ASIC) implemented in the form of a system on chip (SoC).

A memory 20 may be connected to the processor 10 during operation, and may store programs and/or instructions for processing and controlling the processor 10. In addition, the memory 20 may store data and information used in the present disclosure, control information necessary for data and information processing according to the present disclosure, and temporary data generated during data and information processing. The memory 20 may be implemented as a storage device such as read only memory (ROM), random access memory (RAM), erasable programmable read only memory (EPROM), electrically erasable programmable read-only memory (EEPROM), flash memory, and static RAM (SRAM), hard disk drive (HDD), solid state drive (SSD), etc.

The processor 10 may be operatively connected to the memory 20 and/or a network interface 30 and control the operation of each module in the apparatus 200. In particular, the processor 10 may perform various control functions for performing the proposed method of the present disclosure. The processor 120 may also be called a controller, a microcontroller, a microprocessor, a microcomputer, or the like. The proposed method of the present disclosure may be implemented by hardware, firmware, software, or a combination thereof. In the case of implementing the present disclosure using hardware, an application specific integrated circuit (ASIC) or a digital signal processor (DSP) configured to perform the present disclosure, a digital signal processing device (DSPD), a programmable logic device (PLD), a field programmable gate array (FPGA), and the like may be provided in the processor 10. On the other hand, when implementing the proposed method of the present disclosure using firmware or software, the firmware or software may include instructions related to modules, procedures, or functions that perform functions or operations necessary to implement the proposed method of the present disclosure. Here, when the instructions are stored in the memory 20 or stored in a computer-readable recording medium (not shown) separate from the memory 20 and executed by the processor 10, the apparatus 120 may be configured to implement the proposed method of the present disclosure.

In addition, the apparatus 200 may include the network interface device 30. The network interface device 30 may be connected to the processor 10 during operation, and the processor 10 may control the network interface device 30 to transmit or receive information and/or data, signals, messages, etc., through a wireless/wired network. The network interface device 30 may support various communication standards such as IEEE 802 series, 3GPP LTE(-A), and 3GPP 5G, and transmit and receive control information and/or data signals according to the communication standards. The network interface device 30 may be implemented outside the apparatus 200 as needed.

Accordingly, according to an embodiment of the present disclosure, in a method, apparatus, system, and computer program for task deployment in a cloud system, it is possible to prevent load from being concentrated on a specific function accelerator card capable of accelerating a specific function in a cloud environment.

In addition, according to an embodiment of the present disclosure, in a method, apparatus, system, and computer program for task deployment in a cloud system, it is possible to redistribute the load more efficiently by considering the resource situation after program deployment.

The above embodiments and drawings described in this specification are merely illustrative, and do not limit the scope of the present disclosure in any way. In addition, connections of lines or connecting members among components shown in the drawings are examples of functional connections and/or physical or circuit connections and may be embodied various functional connections, physical connections, or circuit connections that are substitutable or addable in an actual apparatus. In addition, unless mentioned in detail such as “essential”, “importantly” and the like, components may be not necessarily needed for applying the present disclosure.

In addition, the use of the term “said” or a similar directional term in the specification (in particular, in claims) of the present disclosure may correspond to both the singular and the plural. In addition, when a range is disclosed in the present disclosure, inventions to which individual values belonging to the range are applied are included (if there is no disclosure opposed to this), and this is the same as that each of the individual values forming the range is disclosed in the detailed description of the present disclosure. In addition, for steps forming the methods according to the present disclosure, if an order is not clearly disclosed or, if there is no disclosure opposed to the clear order, the steps can be performed in a proper order. The present disclosure is not necessarily limited to the disclosed order of the steps. The use of all illustrations or illustrative terms (for example, and so forth, etc.) in the present disclosure is simply to describe the present disclosure in detail, and the scope of the present disclosure is not limited due to the illustrations or illustrative terms unless they are limited by claims. In addition, it will be understood by those of ordinary skill in the art that various modifications, combinations, and changes can be formed according to design conditions and factors within the scope of the attached claims or the equivalents.

DESCRIPTION OF REFERENCE NUMERAL

10: Processor
20: Memory
30: Interface device
50: Task
60*a*: Host server performance evaluation result
60*b*: FAC performance evaluation result

70: Task deployment policy
100: Task deployment system
110: Cloud system
110*a*: Private cloud service area
110*b*: Control area
111*a*, 111*b*, 111*c*: Servers
112*a*, 112*b*, 112*c*: Function accelerator cards
113: Hypervisor
114*a*, 114*b*, 114*c*, 114*d*: Agents
115*a*, 115*b*, 115*c*: Function accelerators
116: Cloud management service
117: Task manager
120: Task deployment apparatus
121: Task analysis unit
122: Task deployment unit
125: Resource status-determination unit
126: Execution performance estimate-calculation unit
127: Task deployment location-selection unit
130: Communication network
200: Apparatus

What is claimed is:

1. A task deployment method in a cloud system including one or more host servers and one or more function accelerator cards, which is performed by one or more processors in a task deployment apparatus, the task deployment method comprising:

determining a status of each of available resources for the one or more host servers and the one or more function accelerator cards;

calculating each of performance estimation values when a task to be deployed is executed in the one or more host servers or the one or more function accelerator cards under the condition of the each of the available resources; and selecting the host servers or the function accelerator cards in which the task is to be deployed in consideration of the each of the performance estimation values, wherein the determining comprises generating overall system resource status information for the cloud system based on the status of the available resources collected using each of agents installed in the one or more host servers and the one or more function accelerator cards.

2. The task deployment method of claim 1, wherein each of the agents is configured to generate the overall system resource status information by transmitting information on the available resources collected at predetermined intervals to a resource manager of the cloud system.

3. The task deployment method of claim 2, wherein each of the agents is configured to periodically collect information on all resources, currently available resources, and resources currently occupied by other tasks for each of the one or more host servers and the one or more function accelerator cards, and transmit the collected information to the resource manager.

4. The task deployment method of claim 2, wherein, in the determining, the task deployment apparatus requests the overall system resource status information from the resource manager of the cloud system, and receives the requested information.

5. The task deployment method of claim 2, wherein the resource manager is configured to be driven by a function accelerator card, from the function accelerator cards, mounted on a control server of the cloud system.

6. The task deployment method of claim 1, wherein the selecting comprises, when a deployment request for the task is received, receiving the current overall system resource status information, and comparing the received status information with the each of the performance estimation values to select the host servers or the function accelerator cards in which the task is to be deployed.

7. The task deployment method of claim 1, wherein a first task that does not meet target performance is selected from already deployed tasks, and the first task is re-deployed by being subjected to the determining, the calculating, and the selecting.

8. The task deployment method of claim 1, wherein the task deployment apparatus is implemented as a separate server that is separated from the cloud system and interoperates through a communication network.

9. The task deployment method of claim 1, further comprising calculating and storing a required resource estimation value and a performance estimation value from the performance estimation values according to the required resource estimation value, respectively, when one or more tasks are deployed in the one or more host servers and the one or more function accelerator cards.

10. The task deployment method of claim 9, wherein overall task performance profile information is configured by combining the one or more tasks for each of the one or more host servers and the one or more function accelerator cards and for each of the required resource estimation values, and calculating the performance estimation value according to each combination.

11. A non-transitory computer-readable storage medium storing instructions that cause, when executed by a processor, an apparatus comprising the processor configured to implement operations for task deployment in a cloud system including one or more host servers and one or more function accelerator cards, wherein the operations comprise:

determining a status of each of available resources for the one or more host servers and the one or more function accelerator cards;

calculating each of performance estimation values when a task to be deployed is executed in the one or more host servers or the one or more function accelerator cards under the condition of each of the available resources; and selecting the host servers or the function accelerator cards in which the task is to be deployed in consideration of each of the performance estimation values, wherein the determining comprises generating overall system resource status information for the cloud system based on the status of the available resources collected using each of agents installed in the one or more host servers and the one or more function accelerator cards.

12. A task deployment apparatus that comprises a processor and deploys tasks for a cloud system having one or more host servers and one or more function accelerator cards, wherein the processor is configured to perform:

determining the status of each of available resources for the one or more host servers and the one or more function accelerator cards;

calculating each of performance estimation values when the task to be deployed is executed in the one or more host servers or the one or more function accelerator cards under the condition of each of the available resources; and selecting the host servers or function accelerator cards in which the task is to be deployed in consideration of each of the performance estimation values, wherein the determining comprises requesting the overall system resource status information from the resource manager of the cloud system, and receiving the requested information.

13. A task deployment apparatus that comprises a processor and deploys tasks for a cloud system having one or more host servers and one or more function accelerator cards, wherein the processor is configured to perform:

determining the status of each of available resources for the one or more host servers and the one or more function accelerator cards;

calculating each of performance estimation values when the task to be deployed is executed in the one or more host servers or the one or more function accelerator cards under the condition of each of the available resources; and selecting the host servers or function accelerator cards in which the task is to be deployed in consideration of each of the performance estimation values, wherein the determining comprises generating overall system resource status information for the cloud system based on the status of available resources collected using each of agents installed in the one or more host servers and the one or more function accelerator cards.

14. The task deployment apparatus of claim 13, wherein each of the agents is configured to generate the overall system resource status information by transmitting information on the available resources collected at predetermined intervals to a resource manager of the cloud system.

15. The task deployment apparatus of claim 14, wherein each of the agents is configured to periodically collect information on all resources, currently available resources, and resources currently occupied by other tasks for each of the one or more host servers and the one or more function accelerator cards, and transmit the collected information to the resource manager.

16. The task deployment apparatus of claim 13, wherein the selecting comprises, when a deployment request for the task is received, receiving the current overall system resource status information, and comparing the received status information with the each of the performance estimation values to select the host servers or the function accelerator cards in which the task is to be deployed.

17. The task deployment apparatus of claim 16, wherein a first task that does not meet target performance is selected from already deployed tasks, and the first task is re-deployed by being subjected to the determining, the calculating, and the selecting.

18. The task deployment apparatus of claim 13, wherein the processor is configured to further perform selecting and re-deploying a first task that does not meet target performance from already deployed tasks.

19. The task deployment apparatus of claim 13, wherein the determining comprises requesting the overall system resource status information from the resource manager of the cloud system, and receiving the requested information.

* * * * *